United States Patent
Patil et al.

(10) Patent No.: US 11,566,172 B2
(45) Date of Patent: Jan. 31, 2023

(54) DOWNHOLE HIGH TEMPERATURE RHEOLOGY CONTROL

(71) Applicant: HALLIBURTON ENERGY SERVICES, INC., Houston, TX (US)

(72) Inventors: Sandip Prabhakar Patil, Pune (IN); Ganesh Pangu, Pune (IN); Tamal Sen, Pune (IN); Maithili Dumbre, Pune (IN); Sam Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/763,274

(22) PCT Filed: Dec. 20, 2017

(86) PCT No.: PCT/US2017/067564
§ 371 (c)(1),
(2) Date: May 12, 2020

(87) PCT Pub. No.: WO2019/125431
PCT Pub. Date: Jun. 27, 2019

(65) Prior Publication Data
US 2020/0308477 A1   Oct. 1, 2020

(51) Int. Cl.
*C09K 8/88* (2006.01)
*E21B 43/26* (2006.01)
(Continued)

(52) U.S. Cl.
CPC ............. *C09K 8/882* (2013.01); *C09K 8/032* (2013.01); *C09K 8/035* (2013.01); *C09K 8/40* (2013.01);
(Continued)

(58) Field of Classification Search
CPC .......... C09K 8/032; C09K 8/035; C09K 8/04; C09K 8/05; C09K 8/14; C09K 8/145;
(Continued)

(56) References Cited

U.S. PATENT DOCUMENTS

| 5,684,075 A | * | 11/1997 | Patel | ..... | C09K 8/12 524/386 |
| 5,693,698 A | * | 12/1997 | Patel | ..... | C09K 8/12 524/386 |

(Continued)

FOREIGN PATENT DOCUMENTS

| WO | 2006032841 A1 | 3/2006 |
| WO | 2014179121 A1 | 11/2014 |

OTHER PUBLICATIONS

International Search Report and Written Opinion issued in PCT Application No. PCT/US2017/067564 dated Sep. 20, 2018.
Altun, Gursat et al. "Sepiolite Based Muds as an Alternate Drilling Fluid for Hot Environments" Proceedings World Geothermal Congress 2015, Melbourne, Australia, Apr. 19-25, 2015.
Examination Report issued in corresponding United Kingdom application No. GB2006380.6, dated Nov. 15, 2021.

*Primary Examiner* — Angela M DiTrani Leff
(74) *Attorney, Agent, or Firm* — McAfee & Taft

(57) ABSTRACT

A method of treating a well comprising introducing a well treatment fluid into the well, and a well treatment fluid, are provided. The well treatment fluid comprises an aqueous base fluid, sepiolite clay, and a polymer component selected from the group of an acryloylmorpholine polymer, a polyvinylpyrrolidone polymer, and mixtures thereof. In one embodiment, for example, the method is a method of drilling a well. In this embodiment, the well treatment fluid is a drilling fluid.

11 Claims, 1 Drawing Sheet

(51) Int. Cl.
*C09K 8/03* (2006.01)
*C09K 8/035* (2006.01)
*C09K 8/40* (2006.01)
*C09K 8/42* (2006.01)
*C09K 8/84* (2006.01)
*C09K 8/90* (2006.01)

(52) U.S. Cl.
CPC .............. *C09K 8/424* (2013.01); *C09K 8/845* (2013.01); *C09K 8/90* (2013.01); *E21B 43/26* (2013.01)

(58) Field of Classification Search
CPC .............. C09K 8/18; C09K 8/22; C09K 8/24; C09K 8/40; C09K 8/424; C09K 8/845; C09K 8/882; C09K 8/90; E21B 43/26
See application file for complete search history.

(56) References Cited

U.S. PATENT DOCUMENTS

| | | | | |
|---|---|---|---|---|
| 5,922,653 | A | * | 7/1999 | Ahmed ................ C07D 249/08 507/242 |
| 6,107,256 | A | * | 8/2000 | Udarbe .................. C09K 8/24 166/295 |
| 2011/0094746 | A1 | | 4/2011 | Allison et al. |
| 2014/0262283 | A1 | | 9/2014 | Savari et al. |
| 2014/0367104 | A1 | * | 12/2014 | Michaux ................ C09K 8/487 166/293 |
| 2016/0264836 | A1 | * | 9/2016 | Wang ....................... C09K 8/20 |
| 2019/0330517 | A1 | * | 10/2019 | Favero ................... C08L 33/14 |

\* cited by examiner

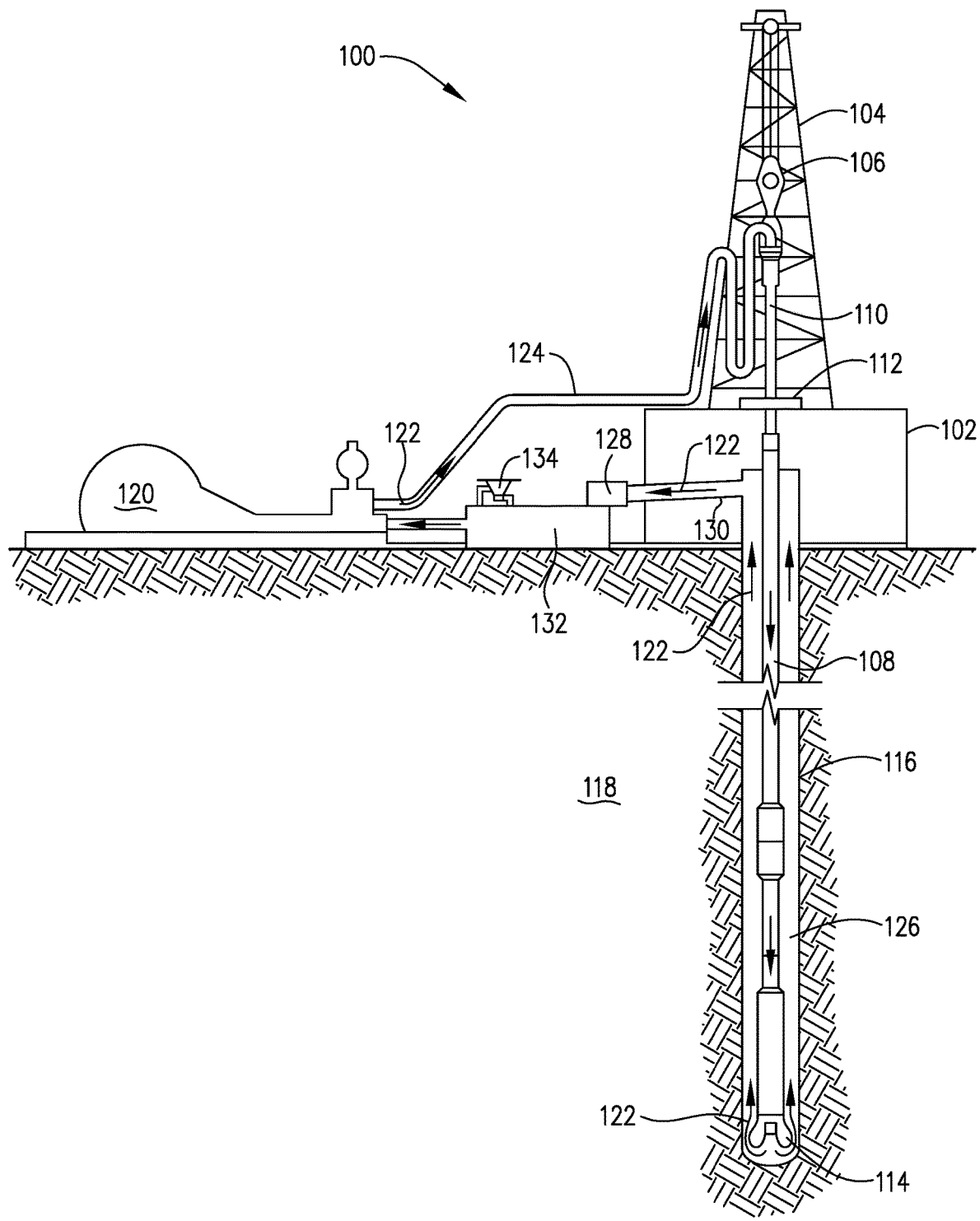

DOWNHOLE HIGH TEMPERATURE RHEOLOGY CONTROL

BACKGROUND

Well treatment fluids are pumped into the well and/or circulated through the wellbore of an oil and gas well in connection with a variety of treatment operations including, for example, drilling operations, cement operations, completion operations and stimulation operations. The components of a particular well treatment fluid and the resulting properties thereof will vary depending on the application, well conditions and other factors known to those skilled in the art.

For example, in drilling a well, an aqueous-based drilling fluid (commonly referred to as a drilling mud) is circulated from the surface through the drill string and drill bit and back to the surface through the annulus between the drill string and the borehole wall. The drilling fluid functions, for example, to cool, lubricate and support the drill bit, remove cuttings from the wellbore, control formation pressures, and maintain the stability of the wellbore.

As another example, prior to a primary or other cementing operation, an aqueous-based spacer fluid is circulated through the wellbore to separate the drilling fluid from the cement slurry and prepare the drill string or casing and the formation for the cementing operation. For example, a spacer fluid is often used to clean out drilling mud and other materials in the wellbore prior to injection of the lead cement slurry. For example, in a primary cementing operation, the spacer fluid displaces the drilling fluid from the annulus and conditions the casing and annular surface to form a good bond with the cement. Spacer fluids can be used to separate fluids in other applications as well.

As yet another example, completion fluids are typically solid-free or low solid fluids that are circulated through the wellbore during final operations and testing to prepare the well for production. For example, once the drilling process is complete, it is often necessary to install gravel packs, production liners, packers, valves and other components in the wellbore. Completion fluids are used during these operations to control the well without damaging producing zones and inhibiting ultimate production from the well. Completion fluids can be used to prepare, repair, clean out and complete the wellbore.

Another example is a fracturing fluid. In a hydraulic fracturing operation, a fracturing fluid is pumped into a subterranean formation at a pressure sufficient to initiate and/or extend one or more fractures in the formation. Proppant particulates are carried by the fracturing fluid and placed in the fracture(s) to hold the fracture(s) open once the hydraulic pressure on the formation is released. The resulting propped fracture provides one or more conductive channels through which fluids in the formation can flow from the formation to the wellbore.

Examples of components that are often added to drilling fluids, cement spacer fluids, completion fluids, fracturing fluids and other well treatment fluids include viscosifiers, suspending agents, gelling agents, gel cross-linkers, fluid loss control additives, weighting agents, lost circulation materials, emulsifiers and other surfactants. For example, viscosifiers and suspending agents are added to well treatment fluids to modify the rheological properties of the fluids. Gelling agents are added to well treatment fluids to increase the viscosity and otherwise modify the rheology of the fluids without changing other properties of the fluid. Fluid loss control additives are added to drilling, spacer, completion and other well treatment fluids to prevent leak-off of the fluids to the formation. Similarly, lost circulation materials are added to drilling, spacer, completion and other well treatment fluids to prevent partial or complete loss of the fluid to a subterranean formation penetrated by the well. Weighting agents such as barite, hematite and other finely ground solid materials having high specific gravities are often added to well treatment fluids in order to control the density of the fluid. Emulsifiers and other surfactants are added for various purposes, for example, to act as a degreaser to promote bonding during a cement operation.

In most applications involving a well treatment fluid, the well treatment fluid is used to circulate solid materials through the wellbore and otherwise transport solid materials into the well. In these applications, the viscosity, yield point and overall rheological behavior of the well treatment fluid are very important. For example, the viscosity and yield point of the well treatment fluid must be sufficient to allow the well treatment fluid to suspend the solid materials in the fluid for the amount of time needed and under the conditions to be encountered in connection with the particular operation.

The viscosity, yield point and other rheological properties of well treatment fluids can begin to deteriorate when the temperature in the wellbore or formation increases, for example, to around 300° F. For example, temperatures above 300° F. are often encountered in deep oil and gas wells, geothermal wells and unconventional wells. For example, the rheological properties of viscosifiers may begin to break down at a temperate of around 300° F. When the viscosity, yield point and other rheological properties of well treatment fluids begin to deteriorate, for example, solid materials being carried by the well treatment fluid can prematurely settle out.

There is a need for well treatment fluids in which the viscosity, yield point and other rheological properties can be maintained at higher temperatures, for example, above 300° F.

BRIEF DESCRIPTION OF THE DRAWINGS

The drawing included with this application illustrates certain aspects of the embodiments described herein. However, the drawing should not be viewed as an exclusive embodiment. The subject matter disclosed herein is capable of considerable modifications, alterations, combinations, and equivalents in form and function, as will be evident to those skilled in the art with the benefit of this disclosure.

The FIGURE is a schematic diagram of an exemplary wellbore drilling assembly and various associated components or pieces of equipment.

DETAILED DESCRIPTION

The present disclosure may be understood more readily by reference to this detailed description as well as to the examples included herein. For simplicity and clarity of illustration, where appropriate, reference numerals may be repeated among the different FIGURES to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

In accordance with the present disclosure, a method of treating a well and a well treatment fluid are provided. Unless stated otherwise, as used herein and in the appended claims, a "well" means a wellbore extending into the ground and a subterranean formation penetrated by the wellbore. For example, a well can be an oil well, a natural gas well, a water well or any combination thereof. A "well treatment fluid" means any fluid that is introduced into a well to treat the well or the subterranean formation.

The method of treating a well disclosed herein comprises introducing a well treatment fluid into the well. The well treatment fluid comprises an aqueous base fluid, sepiolite clay, and a polymer component selected from the group of an acryloylmorpholine polymer, a polyvinylpyrrolidone polymer, and mixtures thereof. For example, the well treatment fluid can be selected from the group of a drilling fluid, a spacer fluid (for example, a cement spacer fluid), a completion fluid and a stimulation fluid (for example, a fracturing fluid). For example, the well treatment fluid can be a selected from the group of a drilling fluid, a cement spacer fluid, and a completion fluid. For example, the well treatment fluid can be a drilling fluid. For example, the well treatment fluid can be a spacer fluid. For example, the well treatment fluid can be a cement spacer fluid. For example, the well treatment fluid can be a completion fluid. For example, the well treatment fluid can be a stimulation fluid. For example, the well treatment fluid can be a fracturing fluid.

For example, the aqueous base fluid of the well treatment fluid disclosed herein can be water. The water can come from a variety of sources. For example, the water can be fresh water. For example, the water can be salt-containing water. Examples of salt-containing water include saltwater, brine (for example, saturated saltwater or produced water), seawater, brackish water, produced water (for example, water produced from a subterranean formation), formation water, treated flowback water, and any combination thereof.

Sepiolite clay, also known as meerschaum, is a soft white clay mineral. It is a complex of magnesium silicate that can be represented by the chemical formula $Mg_4Si_6O_{15}(OH)_2 \cdot 6H_2O$. Sepiolite clay can exist in fibrous, fine-particulate, and other solid forms. For example, sepiolite clay functions in the well treatment fluid and method disclosed herein to impart viscosity to the well treatment fluid.

For example, sepiolite clay can be present in the well treatment fluid in an amount in the range of from about 0.5 pounds to about 50 pounds per barrel of the aqueous base fluid. For example, Sepiolite clay can be present in the well treatment fluid in an amount in the range of from about 1 pound to about 40 pounds per barrel of the aqueous base fluid. For example, sepiolite clay can be present in the well treatment fluid in an amount in the range of from about 2 pounds to about 30 pounds per barrel of the aqueous base fluid. The amount of sepiolite clay used in the well treatment fluid will vary depending on the types and amounts of other components in the well treatment fluid and other factors known to those skilled in the art with the benefit of this disclosure.

As used herein, the term "polymer" means a chemical compound or mixture of compounds formed by polymerization and having repeating structural units (monomers). For example, as used herein, the term "polymer" includes homopolymers, copolymers and terpolymers. For example, the polymer component of the well treatment fluid can be one or more synthetic polymers. For example, the polymer component can be an acryloylmorpholine polymer. For example, the polymer component can be a polyvinylpyrrolidone polymer. For example, the polymer component can be a mixture of an acryloylmorpholine polymer and a polyvinylpyrrolidone polymer. For example, the polymer component also functions in the well treatment fluid and method disclosed herein to impart viscosity to the well treatment fluid.

For example, the polymer component of the well treatment fluid can be selected from the group of an acryloylmorpholine copolymer or terpolymer, a polyvinylpyrrolidone copolymer, and mixtures thereof. For example, the acryloylmorpholine copolymer can selected from the group of an acrylic acid and acryloylmorpholine copolymer, a methacrylic acid and acryloylmorpholine copolymer, an acrylamide and acryloylmorpholine copolymer, an N,N-dimethyl acrylamide and acryloylmorpholine copolymer, a 2-acrylamido-2-methylpropane sulfonic acid and acryloylmorpholine copolymer, and mixtures thereof. For example, the acryloylmorpholine copolymer can be a 2-acrylamido-2-methylpropane sulfonic acid and acryloylmorpholine copolymer.

For example, the polyvinylpyrrolidone copolymer can be selected from the group of an acrylic acid and vinylpyrrolidone copolymer, a methacrylic acid and vinylpyrrolidone copolymer, an acrylamide and vinylpyrrolidone copolymer, an N,N-dimethyl acrylamide and vinylpyrrolidone copolymer, a 2-acrylamido-2-methylpropane sulfonic acid and vinylpyrrolidone copolymer, and mixtures thereof. For example, the polyvinylpyrrolidone copolymer can be a 2-acrylamido-2-methylpropane sulfonic acid and vinylpyrrolidone copolymer.

For example, the polymer component can be present in the well treatment fluid in an amount in the range of from about 0.1 pounds to about 20 pounds per barrel of the aqueous base fluid. For example, the polymer component can be present in the well treatment fluid in an amount in the range of from about 0.3 pounds to about 15 pounds per barrel of the aqueous base fluid. For example, the polymer component can be present in the well treatment fluid in an amount in the range of from about 0.5 pounds to about 10 pounds per barrel of the aqueous base fluid. The amount of the polymer component used in the well treatment fluid will vary depending on the types and amounts of other components in the well treatment fluid and other factors known to those skilled in the art with the benefit of this disclosure.

In accordance with the present disclosure, and as shown by the examples below, the sepiolite and the polymer component have a beneficial, unexpected synergistic effect on the rheological properties and temperature stability of the well treatment fluid in downhole environments. This synergy can be used to maintain the rheological properties and thereby increase the temperature stability of the well treatment fluid to above 300° F., for example to 325° F.

As will be understood by those skilled in the art with the benefit of this disclosure, depending on the application of the method and well treatment fluid disclosed herein, the characteristics of and conditions associated with the well and other factors, the well treatment fluid disclosed herein can further comprise one or more additional components. For example, the well treatment fluid can include one or more additional components selected from the group of viscosifiers, lost circulation materials, weighting agents, non-emulsifiers, emulsifiers, suspending agents, gelling agents, gel cross-linkers, fluid loss control additives, friction reducing agents, clay control agents, buffers and other pH adjusting agents, biocides, bactericides, scale inhibitors, bridging materials, lubricants, corrosion inhibitors, other surfactants, proppant particulates (including conventional or primary proppant particulates and micro-proppant particulates), and gravel. For example, the well treatment fluid can include one or more additional components selected from the group of viscosifiers, lost circulation materials, weighting agents, and non-emulsifiers. As will be understood by those skilled in the art with the benefit of this disclosure, the additional components and the amounts thereof that are utilized will vary depending on the particular application in which the well treatment fluid is used. As used herein and in the appended claims, an "additional component" means a component in addition to the aqueous base fluid, sepiolite clay and polymer component described above.

For example, a primary viscosifier can be included in the well treatment fluid as an additional component therein. As used herein and in the appended claims, a "primary viscosifier" means a viscosifier that has more impact on increasing the viscosity of the well treatment fluid than the sepiolite clay or polymer component described above at a temperature of less than or equal to 300° F. For example, the primary viscosifier can be a polysaccharide. For example, the primary viscosifier can be a polysaccharide selected from the group of xanthan gum, diutan gum, welan gum, scleroglucan gum, and mixtures thereof. For example, the primary viscosifier can be diutan gum. A diutan gum that is suitable for use as or as part of the primary viscosifier component of the well treatment fluid is available from CP Kelco in association with the trademark GEOVIS® XT.

For example, the primary viscosifier can be present in the well treatment fluid in an amount in the range of from about 0.01 pounds to about 15 pounds per barrel of the aqueous base fluid. For example, the primary viscosifier can be present in the well treatment fluid in an amount in the range of from about 0.03 pounds to about 10 pounds per barrel of the aqueous base fluid. For example, the primary viscosifier can be present in the well treatment fluid in an amount in the range of from about 0.05 pounds to about 7 pounds per barrel of the aqueous base fluid. The amount of the primary viscosifier used in the well treatment fluid will vary depending on the types and amounts of other components in the well treatment fluid and other factors known to those skilled in the art with the benefit of this disclosure.

For example, a lost circulation material (a "LCM") can be included in the well treatment fluid as an additional component therein. Examples of LCMs that can be used include calcium carbonate, walnut shale, graphite, and mixtures thereof.

For example, the LCM can be present in the well treatment fluid in an amount in the range of from about 2 pounds to about 100 pounds per barrel of the aqueous base fluid. For example, the LCM can be present in the well treatment fluid in an amount in the range of from about 3 pounds to about 80 pounds per barrel of the aqueous base fluid. For example, the LCM can be present in the well treatment fluid in an amount in the range of from about 5 pounds to about 70 pounds per barrel of the aqueous base fluid. The amount of the LCM used in the well treatment fluid will vary depending on the types and amounts of other components in the well treatment fluid and other factors known to those skilled in the art with the benefit of this disclosure.

For example, another type of additional component that can be included in the well treatment fluid is a polymer gelling agent. Examples of suitable polymer gelling agents that can be used include polyacrylamide, guar and guar derivatives, hydroxyl propyl guar, cellulose and cellulose derivatives, xanthan, diutan, hydroxypropyl cellulose phosphate, hydroxypropyl starch phosphate, and mixtures thereof.

For example, the gelling agent can be present in the well treatment fluid in an amount in the range of from about 0.01 pounds to about 20 pounds per barrel of the aqueous base fluid. For example, the gelling agent can be present in the well treatment fluid in an amount in the range of from about 0.03 pounds to about 15 pounds per barrel of the aqueous base fluid. For example, the gelling agent can be present in the well treatment fluid in an amount in the range of from about 0.05 pounds to about 10 pounds per barrel of the aqueous base fluid. The amount of the gelling agent used in the well treatment fluid will vary depending on the types and amounts of other components in the well treatment fluid and other factors known to those skilled in the art with the benefit of this disclosure.

For example, the well treatment fluid disclosed herein can further comprise a gel stabilizer as an additional component in order to stabilize the gel formed in the well treatment fluid by the gelling agent. For example, the gel stabilizer can be selected from the group of sodium thiosulfate, isoascorbate, erythroborate, and mixtures thereof.

The amount of the gel stabilizer added to the well treatment fluid can vary depending on the amount of the gelling agent present in the well treatment fluid, the conditions of the well, the particular application and other factors known to those skilled in the art with the benefit of this disclosure. For example, the gel stabilizer can be included in the well treatment fluid in an amount in the range of from about 0.001% to about 3% by weight, based on the weight of the aqueous base fluid. For example, the gel stabilizer may be included in the well treatment fluid in an amount in the range of from about 0.01% to about 2% by weight, based on the weight of the aqueous base fluid. For example, the gel stabilizer may be included in the well treatment fluid in an amount in the range of from about 0.1% to about 1% by weight, based on the weight of the aqueous base fluid.

A gel crosslinker can be included in the well treatment fluid as an additional component therein to crosslink the polymer gelling agent and thereby further increase the viscosity of the well treatment fluid. Individuals skilled in the art, with the benefit of this disclosure, will recognize the exact type and amount of gel crosslinker to use, depending on factors such as the specific components used, the desired viscosity, and foiination conditions.

Examples of gel crosslinkers that can be used include boron compounds such as boric acid, disodium octaborate tetrahydrate, sodium diborate, pentaborates, ulexite and colemanite, zirconium compounds such as zirconium compounds that can supply zirconium IV ions, including, for example, zirconium lactate, zirconium acetate lactate, zirconium lactate triethanolamine, zirconium carbonate, zirconium acetylacetonate, zirconium malate, zirconium citrate, and zirconium diisopropylamine lactate, titanium compounds such as compounds that can supply titanium IV ions, including, for example, titanium lactate, titanium malate, titanium citrate, titanium ammonium lactate, titanium triethanolamine, and titanium acetylacetonate, aluminum compounds such as aluminum lactate and aluminum citrate, antimony compounds, chromium compounds, iron compounds, copper compounds, zinc compounds, and any combination thereof. For example, the gel crosslinker can be selected from the group of boron compounds, zirconium compounds, and any combination thereof. For example, the gel crosslinker can be a crosslinker selected from the group of boric acid, disodium octaborate tetrahydrate, sodium diborate, pentaborates, ulexite, colemanite, zirconium lactate, zirconium acetate lactate, zirconium lactate triethanolamine, zirconium carbonate, zirconium acetylacetonate, zirconium malate, zirconium citrate, and zirconium diisopropylamine lactate, and any combination thereof.

For example, when crosslinked with a gel crosslinker as described above, the polymer gelling agent of the well treatment fluid disclosed herein forms a substantially dilute crosslinked system which exhibits no flow when in the steady state. The crosslinked gel is mostly liquid yet behaves like a solid due to a three-dimensional crosslinked network with the liquid.

The amount of the gel crosslinker added to the well treatment fluid can vary depending on the amount of the polymer gelling agent present in the well treatment fluid, the well conditions, the particular application and other factors known to those skilled in the art with the benefit of this disclosure. For example, the gel crosslinker can be included in the well treatment fluid in an amount in the range of from about 0.0001% to about 3% by weight, based on the weight of the aqueous base fluid. For example, the gel crosslinker can be included in the well treatment fluid in an amount in the range of from about 0.001% to about 1% by weight, based on the weight of the aqueous base fluid. For example, the gel crosslinker can be included in the well treatment fluid in an amount in the range of from about 0.001% to about 0.4% by weight, based on the weight of the aqueous base fluid.

An example of a suitable commercially available borate-based crosslinker is "BC-140™" crosslinker available from Halliburton Energy Services, Inc. of Duncan, Okla. An example of a suitable commercially available zirconium-based crosslinker is "CL24™" crosslinker available from Halliburton Energy Services, Inc. of Duncan, Okla. An example of a suitable commercially available titanium-based crosslinking agent is "CL39™" crosslinking agent available from Halliburton Energy Services, Inc. of Duncan, Okla.

For example, the well treatment fluid disclosed herein can further comprise a gel breaker as an additional component therein in order to break the gel formed in the well treatment fluid by the gelling agent (including the crosslinked portion of the gel and the gel itself). The gel breaker can be any gel breaker known to those skilled in the art with the benefit of this disclosure to break a crosslinked gel formed with a polymer gelling agent and thereby decrease the viscosity of the well treatment fluid. Any suitable gel breaker can be used, including encapsulated gel breakers and internal delayed gel breakers, such as enzyme, oxidizing, acid buffer, or temperature-activated gel breakers. Multiple gel breakers can be used. The gel breakers cause the viscous well treatment fluid to revert to a lower viscosity fluid that can be produced back to the surface after the well treatment fluid has been used to treat the well. For example, the gel breaker can be selected from the group of oxidizers, acids, acid releasing agents, enzymes, and any combination thereof. For example, the same gel breaker can be used for both crosslinked and non-crosslinked gels.

The amount of the gel breaker added to the well treatment fluid can vary depending on the amount of the polymer gelling agent present in the well treatment fluid, whether or not the gel is crosslinked, well conditions, the particular application and other factors known to those skilled in the art with the benefit of this disclosure. For example, the gel breaker can be added to the well treatment fluid in an amount in the range of from about 0.0001% by weight to about 10% by weight, based on the amount of the gelled fluid present in the well treatment fluid. For example, the gel breaker can be added to the well treatment fluid in an amount in the range of from about 0.001% by weight to about 10% by weight, based on the amount of the gelled fluid present in the well treatment fluid. For example, the gel breaker can be added to the well treatment fluid in an amount in the range of from about 0.01% by weight to about 10% by weight, based on the amount of the gelled fluid present in the well treatment fluid.

An example of a non-emulsifier that can be used is polyethylene glycol alkyl ether, sulfate ammonium salt, for example, wherein the alkyl ether has from 6 to 10 carbon atoms. For example, a suitable non-emulsifier is sold by Halliburton Energy Services, Inc. in association with the trademark SEM-8™.

Examples of friction reducing agents that can be used include polysaccharides, polyacrylamides and combinations thereof. The polymer gelling agent of the well treatment fluid can also function to reduce friction.

Examples of clay control agents that can be included in the well treatment fluid include salts such as potassium chloride, sodium chloride, ammonium chloride, choline chloride, di-quaternary polymers and poly quaternary polymers.

Examples of buffers and other pH adjusting agents that can be included in the well treatment fluid include sodium hydroxide, potassium hydroxide, sodium carbonate, sodium bicarbonate, potassium carbonate, potassium bicarbonate, acetic acid, sodium acetate, sulfamic acid, hydrochloric acid, formic acid, citric acid, phosphonic acid, polymeric acids and combinations thereof. For example, the pH of the well treatment fluid can be adjusted to activate or deactivate a crosslinking agent or to activate a breaker.

Examples of biocides and bactericides that can be included in the well treatment fluid disclosed herein include 2,2-dibromo-3-nitrilopropionamide, 2-bromo-2-nitro-1,3-propanediol, sodium hypochlorite, and combinations thereof. For example, biocides and bactericides may be included in the fracturing fluid in an amount in the range of from about 0.001% to about 0.1% by weight, based on the weight of the aqueous base fluid.

Examples of scale inhibitors that can be included in the well treatment fluid disclosed herein include bis(hexamethylene triamine penta(methylene phosphonic acid)), diethylene triamine penta(methylene phosphonic acid), ethylene diamine tetra(methylene phosphonic acid), hexamethylenediamine tetra(methylene phosphonic acid), 1-hydroxyethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), methylene phosphonate, phosphonic acid, aminoalkylene phosphonic acid, aminoalkyl phosphonic acid, polyphosphate, salts of polyphosphate, and combinations thereof. For example, the scale inhibitors can be included in the fracturing fluid in an amount in the range of from about 0.001% to about 0.1% by weight, based on the weight of the aqueous base fluid.

Examples of weighting materials that can be included in the well treatment fluid disclosed herein include brines and other salts, barite, and iron (for example, ferrous iron ($Fe_2^+$) and ferrite iron).

Examples of fluid loss control agents and bridging materials that can be included in the well treatment fluid disclosed herein include metal carbonates, polylactic acid, polyvinyl alcohol, clays and other layered materials, and other suitable degradable particles.

Examples of lubricants that can be included in the well treatment fluid disclosed herein include surfactants, vegetable oils, mineral oils, synthetic oils, silicone oils and polymers.

Examples of corrosion inhibitors that can be included in the well treatment fluid disclosed herein include quaternary ammonium compounds, unsaturated carbonyl compounds, unsaturated ether compounds, and other corrosion inhibitors known by those skilled in the art with the benefit of this disclosure to be useful in connection with drilling fluids and fracturing fluids.

Examples of non-emulsifiers that can be included in the well treatment fluid disclosed herein include cationic, nonionic, anionic, and zwitterionic non-emulsifiers. Specific examples of non-emulsifiers that can be used include a combination of terpene and an ethoxylated alcohol, ethoxylated nonyl phenols, octyl phenol polyethoxyethanol, potassium myristate, potassium stearylsulfate, sodium lauryl sulfonate, polyoxyethylene alkyl phenol, polyoxyethylene, polyoxyethylene (20 mole) stearyl ether, N-cetyl-N-ethyl morpholinium ethosulfate, and combinations thereof. For example, a non-emulsifier can be included in the well treatment fluid in an amount in the range of from about 0.001% to about 5% by weight, based on the weight of the aqueous base fluid.

Examples of primary proppant particulates that can be included in the well treatment fluid disclosed herein include the types of proppant particulates included in fracturing fluids, as discussed herein.

Examples of micro-proppant particulates that can be included in the well treatment fluid disclosed herein include the types of micro-proppant particulates included in fracturing fluids, as discussed herein.

Examples of gravel that can be included in the well treatment fluid disclosed herein include the types of gravel included in gravel packing fluids, as discussed herein.

For example, another type of additional component that can be included in the well treatment fluid is a weighting agent. One or more weighting agents can be included in the well treatment fluid as an additional component. Examples of wetting agents that can be used include barite and hematite. Examples of weighting agents that are suitable for use in connection with the well treatment fluid are available from Halliburton Energy Services, Inc. in association with the trademark Hi-Dense®.

For example, the weighting agent can be present in the well treatment fluid in an amount in the range of from about 1 pound to about 800 pounds per barrel of the aqueous base fluid. The amount of the weighting agent used in the well treatment fluid will vary depending on the types and amounts of other components in the well treatment fluid and other factors known to those skilled in the art with the benefit of this disclosure.

In accordance with the method disclosed herein, the well treatment fluid can be introduced into the well, for example, by pumping the well treatment fluid into the well using one or more pumps present on the well site as known to those skilled in the art with the benefit of this disclosure. The components of the well treatment fluid can be mixed together in any manner known to those skilled in the art with the benefit of this disclosure. For example, components can be mixed together using mixing equipment present on the well site. For example, components can be added to the well treatment fluid on the fly as the well treatment fluid is pumped into the wellbore.

The method disclosed herein can further include the step of removing the well treatment fluid from the well.

For example, if a gelling agent is used, a gel can be allowed to form in the well treatment fluid by mixing the aqueous base fluid, sepiolite clay, polymer component, polymer gelling agent, gel stabilizer (if used), gel crosslinker (if used), and gel breaker (if used) of the well treatment fluid together. For example, the components of the well treatment fluid can be mixed together in a blender located on the site of the well. For example, the polymer gelling agent can be in the form of a dry powder or a liquid gel concentrate. Once it is mixed with the aqueous base fluid, a gel is formed.

The gelled well treatment fluid can be allowed to treat the well by pumping the well treatment fluid into the well under a sufficient hydraulic pressure and for a sufficient time to allow the well treatment fluid to treat the well. For example, if necessary, pumping can be stopped and the well can be shut in for an amount of time necessary to allow well treatment fluid to treat the well.

As used herein and in the appended claims, "breaking the gel" formed in the well treatment fluid means allowing the gel formed in the well treatment fluid to break or causing the gel formed in the well treatment fluid to break. For example, the gel formed in the well treatment fluid can be allowed to break on its own (without a gel breaker) due to the temperature or pH in the well or due to the elapse of time. For example, in some cases, exposure of the well treatment fluid to downhole temperatures can be sufficient to cause the gel to break. For example, the gel formed in the well treatment fluid can be caused to break by exposing the well treatment fluid to a gel breaker. For example, a gel breaker can be used to accelerate the gel breaking process initiated by the temperature in the wellbore.

Depending on the nature of the gel breaker, the gel breaker can be included in the initial well treatment fluid first introduced into the well or can be added to the well treatment fluid after the well treatment fluid is first introduced into the well. For example, gel breakers that are encapsulated or internal delayed can be mixed with the initial well treatment fluid first introduced into the well. The same gel breaker can work for both crosslinked and non-crosslinked gels.

Whether the gel is allowed to break or caused to break will vary depending on the amount of the polymer gelling agent used in the well treatment fluid, whether the polymer gelling agent is crosslinked, the well conditions, the particular application and other factors known to those skilled in the art with the benefit of this disclosure. Breaking of the gel lowers the viscosity of the well treatment fluid.

The method can further comprise removing the broken gel from the well. For example, the broken gel can be removed from the well by circulating an inert fluid through the wellbore to flush the well, by flowing back the well, or by other techniques known to those skilled in the art with the benefit of this disclosure.

The well treatment fluid disclosed herein is the well treatment fluid used in the method disclosed herein as described herein.

Due to its enhanced rheological behavior and temperature stability, the method and well treatment fluid disclosed herein can be effectively used in a variety of different types of oil and gas well treatment fluids and applications. For example, the method and well treatment fluid disclosed herein are particularly useful in drilling, cementing and completion operations.

For example, in one embodiment, the method disclosed herein is a method of drilling a well into a subterranean formation, and the well treatment fluid is an aqueous-based drilling fluid for use in drilling wells. In addition to the aqueous base fluid, sepiolite clay and polymer component, the drilling fluid can include, for example, a primary viscosifier, a weighting material, a fluid loss control additive, a bridging material, a lubricant, a corrosion inhibitor and/or a suspending agent.

For example, in another embodiment, the method disclosed herein is a method of cementing in a well, and the well treatment fluid is an aqueous-based cement spacer fluid. In addition to the aqueous base fluid, sepiolite clay and polymer component, the cement spacer fluid can include, for example, a primary viscosifier, a fluid loss control additive, a bridging material, a suspending agent and a weighting agent.

For example, in another embodiment, the method disclosed herein is a method of completing a well, and the well treatment fluid is an aqueous-based completion fluid. In addition to the aqueous base fluid, sepiolite clay and polymer component, the completion fluid can include, for example, a primary viscosifier, a fluid loss control additive, a bridging material, and a suspending agent.

For example, in another embodiment, the method disclosed herein is a method of fracturing a well, and the well treatment fluid is an aqueous-based fracturing fluid. In addition to the aqueous base fluid, sepiolite clay and polymer component, the fracturing fluid can include, for example, a plurality of proppant particulates for propping the fractures open. For example, in this embodiment of the method disclosed herein, the well treatment fluid can be pumped through the wellbore and into the formation at a sufficient pressure to fracture or extend an existing fracture in the formation.

For example, in another embodiment, the method disclosed herein is a method of forming a gravel pack in a well, and the well treatment fluid is an aqueous-based gravel packing fluid. In addition to the aqueous base fluid, sepiolite clay and polymer component, for example, the well treatment fluid can include gravel. In this embodiment of the method disclosed herein, the gravel packing fluid can be pumped through the wellbore and into the formation to place gravel around a sand control screen in the formation.

In one embodiment, the method of treating a well disclosed herein comprises:
(a) introducing a well treatment fluid into the well, the well treatment fluid including:
  (i) an aqueous base fluid;
  (ii) sepiolite clay present in the well treatment fluid in an amount in the range of from about 0.5 pounds to about 50 pounds per barrel of the aqueous base fluid;
  (iii) a polymer component selected from the group of an acryloylmorpholine copolymer, a polyvinylpyrrolidone copolymer, and mixtures thereof, the polymer component being present in the well treatment fluid in an amount in the range of from about 0.1 pounds to about 20 pounds per barrel of the aqueous base fluid; and
  (iv) one or more additional components selected from the group of viscosifiers, lost circulation materials, weighting agents, and non-emulsifiers.

In another embodiment, the method of treating a well disclosed herein comprises:
(a) introducing a well treatment fluid into the well, the well treatment fluid including:
  (i) an aqueous base fluid;
  (ii) sepiolite clay present in the well treatment fluid in an amount in the range of from about 0.5 pounds to about 50 pounds per barrel of the aqueous base fluid;
  (iii) a polymer component selected from the group of an acryloylmorpholine copolymer, a polyvinylpyrrolidone copolymer, and mixtures thereof, the acryloylmorpholine copolymer being selected from the group of an acrylic acid and acryloylmorpholine copolymer, a methacrylic acid and acryloylmorpholine copolymer, an acrylamide and acryloylmorpholine copolymer, an N,N-dimethyl acrylamide and acryloylmorpholine copolymer, a 2-acrylamido-2-methylpropane sulfonic acid and acryloylmorpholine copolymer, and mixtures thereof, and the polyvinylpyrrolidone copolymer being selected from the group of an acrylic acid and vinylpyrrolidone copolymer, a methacrylic acid and vinylpyrrolidone copolymer, an acrylamide and vinylpyrrolidone copolymer, an N,N-dimethyl acrylamide and vinylpyrrolidone copolymer, a 2-acrylamido-2-methylpropane sulfonic acid and vinylpyrrolidone copolymer, and mixtures thereof, wherein the polymer component is present in the well treatment fluid in an amount in the range of from about 0.1 pounds to about 20 pounds per barrel of the aqueous base fluid; and
  (iv) a primary viscosifier present in the well treatment fluid in an amount in the range of from about 0.01 pounds to about 15 pounds per barrel of the aqueous base fluid.

In one embodiment, the well treatment fluid disclosed herein comprises:
(a) an aqueous base fluid;
(b) sepiolite clay present in the well treatment fluid in an amount in the range of from about 0.5 pounds to about 50 pounds per barrel of the aqueous base fluid;
(c) a polymer component selected from the group of an acryloylmorpholine copolymer, a polyvinylpyrrolidone copolymer, and mixtures thereof, the polymer component being present in the well treatment fluid in an amount in the range of from about 0.1 pounds to about 20 pounds per barrel of the aqueous base fluid; and
(d) one or more additional components selected from the group of viscosifiers, lost circulation materials, weighting agents, and non-emulsifiers.

In another embodiment, the well treatment fluid disclosed herein comprises:
(a) an aqueous base fluid;
(b) sepiolite clay present in the well treatment fluid in an amount in the range of from about 0.5 pounds to about 50 pounds per barrel of the aqueous base fluid;
(c) a polymer component selected from the group of an acryloylmorpholine copolymer, a polyvinylpyrrolidone copolymer, and mixtures thereof, the acryloylmorpholine copolymer being selected from the group of an acrylic acid and acryloylmorpholine copolymer, a methacrylic acid and acryloylmorpholine copolymer, an acrylamide and acryloylmorpholine copolymer, an N,N-dimethyl acrylamide and acryloylmorpholine copolymer, a 2-acrylamido-2-methylpropane sulfonic acid and acryloylmorpholine copolymer, and mixtures thereof, and the polyvinylpyrrolidone copolymer being selected from the group of an acrylic acid and vinylpyrrolidone copolymer, a methacrylic acid and vinylpyrrolidone copolymer, an acrylamide and vinylpyrrolidone copolymer, an N,N-dimethyl acrylamide and vinylpyrrolidone copolymer, a 2-acrylamido-2-methylpropane sulfonic acid and vinylpyrrolidone copolymer, and mixtures thereof, wherein the polymer component is present in the well treatment fluid in an amount in the range of from about 0.1 pounds to about 20 pounds per barrel of the aqueous base fluid; and (d) a primary viscosifier present in the well treatment fluid in an amount in the range of from about 0.01 pounds to about 15 pounds per barrel of the aqueous base fluid.

The exemplary chemicals, compounds, additives, agents and fluids ("exemplary components") disclosed herein may directly or indirectly affect one or more components or pieces of equipment associated with the preparation, delivery, recapture, recycling, reuse, and/or disposal of the disclosed exemplary fluids. For example, and with reference to the FIGURE, the disclosed exemplary fluids may directly or indirectly affect one or more components or pieces of equipment associated with an exemplary wellbore drilling assembly 100, according to one or more examples. It should be noted that while the FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed exemplary fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other examples, however, the disclosed exemplary fluids may be added to the drilling fluid 122 at any other location in the drilling assembly 100. In at least one example, for example, there could be more than one retention pit 132, such as multiple retention pits 132 in series. Moreover, the retention pit 132 may be representative of one or more fluid storage facilities and/or units where the disclosed exemplary fluids may be stored, reconditioned, and/or regulated until added to the drilling fluid 122.

As mentioned above, the disclosed exemplary fluids may directly or indirectly affect the components and equipment of the drilling assembly 100. For example, the disclosed exemplary fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and any fluid reclamation equipment. The fluid processing unit(s) 128 may further include one or more sensors, gauges, pumps, compressors, and the like used to store, monitor, regulate, and/or recondition the exemplary fluids.

The disclosed exemplary fluids may directly or indirectly affect the pump 120, which representatively includes any conduits, pipelines, trucks, tubulars, and/or pipes used to fluidically convey the exemplary fluids downhole, any pumps, compressors, or motors (e.g., topside or downhole) used to drive the exemplary fluids into motion, any valves or related joints used to regulate the pressure or flow rate of the exemplary fluids, and any sensors (i.e., pressure, temperature, flow rate, etc.), gauges, and/or combinations thereof, and the like. The disclosed exemplary fluids may also directly or indirectly affect the mixing hopper 134 and the retention pit 132 and their assorted variations.

The disclosed exemplary fluids may also directly or indirectly affect the various downhole equipment and tools that may come into contact with the exemplary fluids such as, but not limited to, the drill string 108, any floats, drill collars, mud motors, downhole motors and/or pumps associated with the drill string 108, and any for measurement-while-drilling ("MWD") or logging-while-drilling ("LWD") tools and related telemetry equipment, sensors or distributed sensors associated with the drill string 108. The disclosed exemplary fluids may also directly or indirectly affect any downhole heat exchangers, valves and corresponding actuation devices, tool seals, packers and other wellbore isolation devices, components and the like associated with the wellbore 116. The disclosed exemplary fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed exemplary fluids may also directly or indirectly affect any transport or delivery equipment used to convey the exemplary fluids to the drilling assembly 100 such as, for example, any transport vessels, conduits, pipelines, trucks, tubulars, and/or pipes used to fluidically move the exemplary fluids from one location to another, any pumps, compressors, or motors used to drive the exemplary fluids into motion, any valves or related joints used to regulate the pressure or flow rate of the exemplary fluids, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

First, sepiolite and various synthetic polymers were combined in a well treatment fluid and tested for rheology on a Fann®-77 rheometer. The polymers used in the tests are set forth below:

Polymer 1—an acrylamide and acryloylmorpholine copolymer;
Polymer 2—a polyvinylpyrrolidone-based polymer;
Polymer 3—a 2-acrylamido-2-methylpropane sulfonic acid and acrylamide based graft polymer; and
Polymer 4—a 2-acrylamido-2-methylpropane sulfonic acid and acrylamide based non-grafted polymer.

The formulations tested are shown by Table 1 below. Each formulation had a density of 16 lb/gal and included the following components:
(a) a primary viscosifier, specifically diutan gum;
(b) a fine sized, granular lost circulation material;
(c) sepiolite clay;
(d) the polymer being tested (as indicated by the table);
(e) citric acid;
(f) barite; and
(f) a non-emulsifier, specifically a polyethylene glycol (C6-C10) alkyl ether, sulfate ammonium salt sold by Halliburton Energy Services, Inc. in association with the trademark SEM-8™.

The primary viscosifier, diutan, is normally effective up to 300° F.

TABLE 1

| Formulations with Diutan Gum | | | | | | |
|---|---|---|---|---|---|---|
| Materials | UoM | Expt#1 | Expt#2 | Expt#3 | Expt#4 | Expt#5 |
| Diutan Gum | PPB | 0.35 | 0.35 | — | 0.35 | 0.35 |
| LCM | PPB | 17 | 17 | 17 | 17 | 17 |
| Polymer 1 | PPB | 1.9 | — | 1.9 | — | — |
| Polymer 4 | PPB | — | — | — | 1.9 | — |
| Polymer 2 | PPB | — | — | — | — | 1.9 |
| Sepiolite | PPB | 7.5 | 7.5 | 7.5 | 7.5 | 7.5 |
| Citric Acid | PPB | 0.3 | 0.3 | 0.3 | 0.3 | 0.3 |
| Barite | PPB | 407 | 407 | 407 | 407 | 407 |
| SEM-8™ | gal/bbl | 0.5 | 0.5 | 0.5 | 0.5 | 0.5 |

The results are shown by Table 2 below.

TABLE 2

| Rheology for formulations having Diutan Gum | | | | | | | | | | | |
|---|---|---|---|---|---|---|---|---|---|---|---|
| | Temperature | Dial Reading on Fann®-77 with pressure 3000 psi | | | | | | | | Bingham Plastic Model | |
| Expt. No. | (° F.) | 3 | 6 | 30 | 60 | 100 | 200 | 300 | 600 | PV (cP) | YP (lbf/100 ft2) |
| 1 | 80 | 22 | 26 | 45 | 63 | 84 | 123 | 156 | 237 | 106 | 39 |
|   | 180 | 29 | 31 | 43 | 54 | 65 | 89 | 110 | 160 | 65 | 40 |
|   | 250 | 32 | 33 | 38 | 45 | 53 | 69 | 82 | 111 | 40 | 38 |
|   | 300 | 31 | 32 | 36 | 40 | 45 | 57 | 69 | 89 | 30 | 36 |
|   | 325 | 18 | 20 | 21 | 21.5 | 22 | 26 | 30 | 46 | 13 | 20 |
| 2 | 80 | 26 | 28 | 38 | 46 | 55 | 76 | 97 | 144 | 59 | 34 |
|   | 180 | 24 | 26 | 32 | 37 | 44 | 55 | 66 | 88 | 32 | 31 |
|   | 250 | 21 | 22 | 27 | 31 | 36 | 45 | 53 | 70 | 24 | 26 |
|   | 300 | 12 | 14 | 19 | 24 | 29 | 36 | 43 | 62 | 24 | 18 |
|   | 325 | 6 | 6.5 | 8 | 11 | 12 | 14 | 17 | 33 | 13 | 7 |
| 3 | 80 | 4 | 5 | 8 | 13 | 19 | 34 | 49 | 90 | 43 | 5 |
|   | 180 | 6 | 6.5 | 9 | 11 | 14 | 21 | 28 | 54 | 24 | 6 |
|   | 250 | 6.5 | 7 | 9 | 10 | 12 | 15 | 21 | 35 | 14 | 7 |
|   | 300 | 7 | 8 | 9.5 | 11 | 12.5 | 16 | 20 | 34 | 13 | 8 |
|   | 325 | 9 | 10 | 13 | 15 | 17 | 20 | 24 | 35 | 12 | 12 |
| 4 | 80 | 16 | 20 | 39 | 56 | 74 | 108 | 134 | 199 | 90 | 34 |
|   | 180 | 13 | 17 | 32 | 42 | 54 | 77 | 96 | 134 | 59 | 28 |
|   | 250 | 10 | 13 | 24 | 32 | 40 | 57 | 71 | 99 | 44 | 21 |
|   | 300 | 8 | 10 | 19 | 25 | 32 | 45 | 54 | 79 | 35 | 16 |
|   | 325 | 3 | 3.5 | 4 | 5 | 6 | 8 | 13 | 22 | 9 | 3 |
| 5 | 80 | 12 | 17 | 38 | 57 | 78 | 115 | 141 | 225 | 102 | 31 |
|   | 180 | 17 | 23 | 38 | 51 | 64 | 91 | 110 | 158 | 68 | 34 |
|   | 250 | 20 | 22 | 34 | 43 | 53 | 73 | 87 | 119 | 49 | 32 |
|   | 300 | 17 | 18 | 27 | 34 | 42 | 56 | 66 | 90 | 36 | 26 |
|   | 325 | 11 | 13 | 14 | 16 | 17 | 22 | 28 | 39 | 14 | 13 |

The results show that Polymer 1 (an acrylamide and acryloylmorpholine copolymer) (Experiment no. 1) and Polymer 2 (a polyvinylpyrrolidone-based polymer) (Experiment no. 5) show good retention of rheology at 325° F.

Experiment no. 2 was performed to check for any synergy between sepiolite and the primary viscosifier (diutan gum) with no synthetic polymer. The results clearly indicate that there is no synergy sepiolite and the primary viscosifier (diutan gum) without the synthetic polymer.

Experiment no. 3 was performed to check the rheology of the test fluid without the primary viscosifier (diutan gum). As expected, the rheology at the surface was reduced drastically, but as the temperature increased the yield point also increased with good rheology at 325° F.

Experiment no. 4 was performed by using Polymer 4 (a 2-acrylamido-2-methylpropane sulfonic acid and acrylamide based non-grafted polymer). This fluid did not show good rheology at 325° F. From experiment nos. 3 and 4, it is evident that the synergy between Polymer 1 and sepiolite shows good retention of rheology at 325° F.

Next, similar tests were carried out using welan gum as the primary viscosifier. Also, the synergy of Polymer 1 (an acrylamide and acryloylmorpholine copolymer) was tested with two different clays, i.e., sepiolite and attapulgite.

The formulations tested are shown by Table 3 below.

TABLE 3

Formulations with Welan Gum

| Materials | UoM | Expt#6 | Expt#7 | Expt#8 | Expt#9 |
|---|---|---|---|---|---|
| Welan Gum | PPB | 0.2 | 0.2 | 0.4 | 0.2 |
| LCM | PPB | 10.5 | 10.5 | 10.5 | 10.5 |
| Polymer 1 | PPB | 1.3 | 1.3 | — | — |
| Sepiolite | PPB | 6.5 | — | 6.5 | 6.5 |
| Attapulgite | PPB | — | 6.5 | — | — |
| Polymer 3 | PPB | — | — | — | 1.3 |
| Barite | PPB | 411.4 | 411.4 | 411.4 | 411.4 |

The results of the tests are shown in Table 4 below.

TABLE 4

Rheology for Formulations having Welan Gum

| Expt. No | Temperature (° F.) | Dial Reading on Fann®-77 with pressure 3000 psi | | | | | | | | Bingham Plastic Model | |
|---|---|---|---|---|---|---|---|---|---|---|---|
| | | 3 | 6 | 30 | 60 | 100 | 200 | 300 | 600 | PV (cP) | YP (lbf/100 ft2) |
| 6 | 80 | 25 | 26 | 36 | 44 | 53 | 71 | 89 | 132 | 53 | 33 |
| | 300 | 18 | 20 | 23 | 27 | 32 | 40 | 46 | 63 | 22 | 23 |
| | 325 | 14 | 16.5 | 17 | 17 | 18 | 20 | 23 | 29 | 7 | 16 |
| | 350 | 10 | 10 | 11 | 11 | 12 | 16 | 21 | 29 | 9 | 10 |
| 7 | 80 | 20 | 22 | 35 | 45 | 58 | 84 | 108 | 165 | 72 | 30 |
| | 300 | 16 | 17 | 21 | 23 | 30 | 39 | 48 | 69 | 26 | 20 |
| | 325 | 6 | 7 | 7 | 8 | 8 | 10 | 13 | 24 | 8 | 6 |
| 8 | 80 | 29 | 35 | 49 | 59 | 71 | 94 | 115 | 164 | 65 | 44 |
| | 300 | 29 | 31 | 37 | 42 | 45 | 51 | 56 | 70 | 19 | 37 |
| | 325 | 4 | 5 | 5 | 6 | 7 | 8 | 11 | 24 | 9 | 4 |
| 9 | 80 | 20 | 21 | 26 | 33 | 41 | 58 | 71 | 112 | 46 | 24 |
| | 300 | 10 | 10.5 | 11 | 12 | 13 | 16 | 18 | 29 | 9 | 11 |
| | 325 | 5.5 | 6 | 6 | 6.5 | 7 | 8 | 10 | 23 | 8 | 5 |

The results shown by Table 4 confirm that the synergy between Polymer 1 (an acrylamide and acryloylmorpholine copolymer) and sepiolite results in the retention of a good yield point at higher temperature. This synergy is seen with sepiolite but not with Attapulgite clay. The combination of sepiolite and Polymer 3 (a 2-acrylamido-2-methylpropane sulfonic acid and acrylamide based graft polymer) does not show any synergy.

Therefore, the present treatment additives and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a well, comprising:
   introducing a well treatment fluid into the well having a treatment site with a well temperature above 300° F., said well treatment fluid including:
   a primary viscosifier;
   an aqueous base fluid;
   sepiolite clay present in the well treatment fluid in an amount in the range of from about 0.5 pounds to about 50 pounds per barrel of the aqueous base fluid; and
   a non-crosslinked polymer component selected from the group consisting of a copolymer consisting of acrylamide and acryloylmorpholine, a polyvinylpyrrolidone polymer, and mixtures thereof, the polymer component being present in the well treatment fluid in an amount in the range of from about 0.1 pounds to about 20 pounds per barrel of the aqueous base fluid;
   wherein the well treatment fluid maintains its rheological properties at well temperatures from 300° F. to 350° F. so as to maintain its rheological properties at the treatment site including maintaining a yield point of at least 10 lbf/100 ft$^2$ to about 36 lbf/100 ft$^2$.

2. The method of claim 1, wherein said aqueous base fluid is water.

3. The method of claim 1, wherein said sepiolite clay is present in the well treatment fluid in an amount in the range of from about 2 pounds to about 30 pounds per barrel of the aqueous base fluid.

4. The method of claim 1, wherein the well treatment fluid maintains its rheological properties at well temperatures from 300° F. to about 325° F. including maintaining a yield point above 10 lbf/100 ft$^2$ to about 36 lbf/100 ft$^2$.

5. The method of claim 1, wherein said non-crosslinked polymer component is the copolymer consisting of acrylamide and acryloylmorpholine.

6. The method of claim 1, wherein said non-crosslinked polymer is the polyvinylpyrrolidone polymer.

7. The method of claim 6, wherein said polyvinylpyrrolidone polymer is a polyvinylpyrrolidone copolymer selected from the group of an acrylic acid and vinylpyrrolidone copolymer, a methacrylic acid and vinylpyrrolidone copolymer, an acrylamide and vinylpyrrolidone copolymer, an N,N-dimethyl acrylamide and vinylpyrrolidone copolymer, and mixtures thereof.

8. The method of claim 1, wherein said non-crosslinked polymer component is present in the well treatment fluid in an amount in the range of from about 0.5 pounds to about 10 pounds per barrel of the aqueous base fluid.

9. The method of claim 8, wherein said polyvinylpyrrolidone polymer is a polyvinylpyrrolidone copolymer selected from the group of an acrylic acid and vinylpyrrolidone copolymer, a methacrylic acid and vinylpyrrolidone copolymer, an acrylamide and vinylpyrrolidone copolymer, an N,N-dimethyl acrylamide and vinylpyrrolidone copolymer, and mixtures thereof.

10. The method of claim 1, wherein said well treatment fluid is selected from the group of a drilling fluid, a cement spacer fluid, a completion fluid and a stimulation fluid.

11. The method of claim 1, wherein said well treatment fluid is introduced into the well using pumping equipment.

* * * * *